United States Patent [19]
Schaulin et al.

[11] Patent Number: 5,324,330
[45] Date of Patent: Jun. 28, 1994

[54] DYE MIXTURES AND THE USE THEREOF
[75] Inventors: Rudolf Schaulin, Riehen; Urs Lauk, Zürich, both of Switzerland
[73] Assignee: Ciba-Geigy Corporation, Ardsley, N.Y.
[21] Appl. No.: 988,539
[22] Filed: Dec. 10, 1992
[30] Foreign Application Priority Data
Dec. 17, 1991 [CH] Switzerland ............ 3720/91
[51] Int. Cl.$^5$ .................. D06P 1/00; C09B 56/00
[52] U.S. Cl. ............................. 8/639; 8/638; 8/549; 8/662; 8/673; 8/681; 8/688; 8/918; 8/922; 8/641
[58] Field of Search ............... 8/638, 639, 641, 549, 8/662, 673, 681, 688, 918, 922

[56] References Cited
U.S. PATENT DOCUMENTS

| | | | |
|---|---|---|---|
| 4,323,497 | 4/1982 | Hoyer et al. | 260/153 |
| 4,378,312 | 3/1983 | Hoyer et al. | 8/639 |
| 4,620,875 | 11/1986 | Shimada et al. | 106/22 |
| 4,686,286 | 8/1987 | Niwa et al. | 534/637 |
| 4,875,903 | 10/1989 | Pedrazzi | 8/640 |
| 4,888,028 | 12/1989 | Hihara et al. | 8/639 |

FOREIGN PATENT DOCUMENTS

| | | |
|---|---|---|
| 2748975 | 5/1979 | Fed. Rep. of Germany . |
| 662580 | 6/1985 | Switzerland . |
| 2226336 | 6/1990 | United Kingdom . |

OTHER PUBLICATIONS
Chem. Abst. 62 (1965) 10563f.
Chem. Abst. 68 (1968) 79637y.
Chem. Abst. 95 (1981) 63664b.
Chem. Abst. 111 (1989) 196985c.
Chem. Abst. 112 (1990) 58458c.

Primary Examiner—Paul Lieberman
Assistant Examiner—Margaret Einsmann
Attorney, Agent, or Firm—Kevin T. Mansfield; Edward McC. Roberts

[57] ABSTRACT
Dye mixtures comprising at least one dye of formula

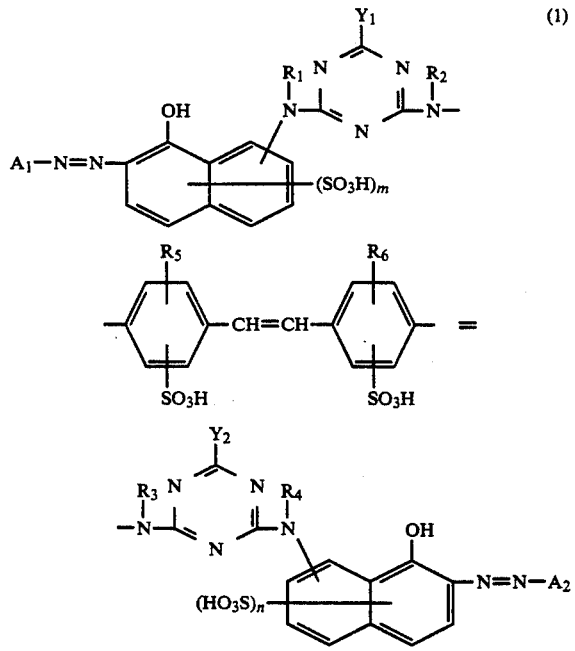

and at least one dye of formula

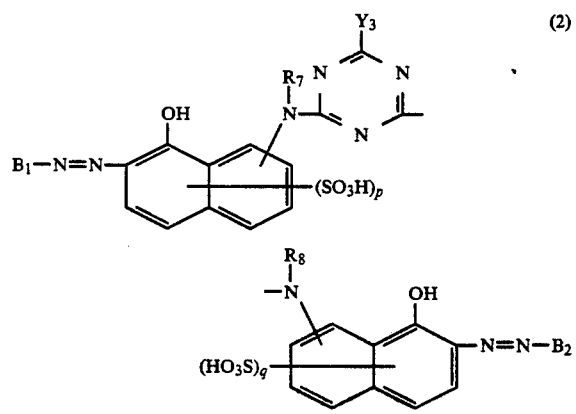

wherein the substituents are as defined in claim 1, have good allround fastness properties and are suitable for dyeing cellulosic fibre materials.

19 Claims, No Drawings

DYE MIXTURES AND THE USE THEREOF

The present invention relates to novel dye mixtures and to the use thereof for dyeing and printing fibre materials, especially textiles fabrics.

The invention has for its object to provide dye mixtures that are suitable for dyeing nitrogen-containing and hydroxyl group containing fibre materials, especially cellulosic materials, and which have good fastness properties and high-temperature stability.

It has been found that the mixture of dyes of formulae (1) and (2) meet these requirements.

Specifically, the invention relates to a dye mixture comprising at least one dye of formula

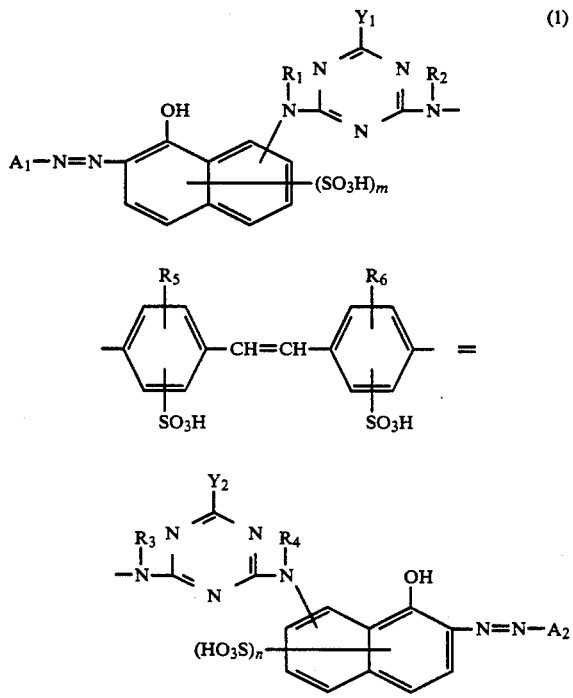

and at least one dye of formula

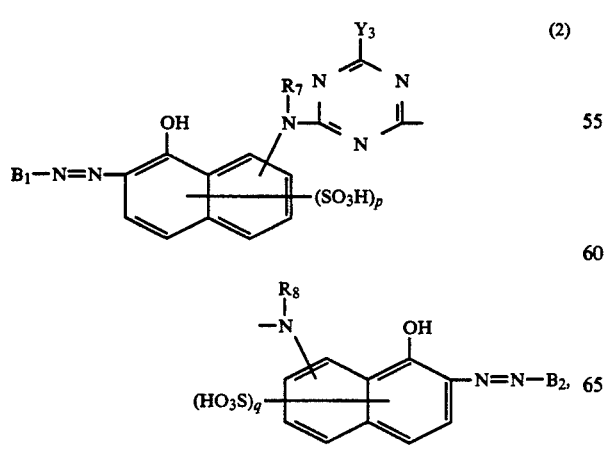

wherein $A_1$, $A_2$, $B_1$ and $B_2$ are each independently of one another unsubstituted or substituted phenyl or naphthyl, $R_1$, $R_2$, $R_3$, $R_4$, $R_7$ and $R_8$ are each independently of one another hydrogen or unsubstituted or substituted $C_1$–$C_8$alkyl, $R_5$ and $R_6$ are each independently of the other hydrogen, unsubstituted or substituted $C_1$–$C_8$alkyl, or are $C_1$–$C_8$alkoxy, halogen, hydroxy, carboxy or sulfo, $Y_1$, $Y_2$ and $Y_3$ are each independently of one another halogen, amino, N-mono- or N,N-di-$C_1$–$C_4$alkylamino which are unsubstituted or substituted in the alkyl moiety or moieties, or are morpholino, and m, n, p and q are each independently of one another 1 or 2.

$A_1$ and $A_2$ in formula (1) and $B_1$ and $B_2$ in formula (2) defined as phenyl or naphthyl are suitably unsubstituted phenyl or naphthyl as well as phenyl or naphthyl which are substituted by $C_1$–$C_4$alkyl, typically methyl, ethyl, propyl, isopropyl, butyl, sec-butyl, tert-butyl or isobutyl, preferably methyl, or $C_1$–$C_4$alkoxy, typically methoxy, ethoxy, propoxy, isopropoxy, butoxy or isobutoxy, preferably methoxy, or by halogen, hydroxy, carboxy or sulfo. Preferably $A_1$, $A_2$, $B_1$ and $B_2$ are unsubstituted or substituted phenyl.

$R_1$, $R_2$, $R_3$, $R_4$, $R_5$ and $R_6$ in formula (2) defined as $C_1$–$C_8$alkyl are preferably $C_1$–$C_4$alkyl, typically methyl, ethyl, propyl, isopropyl, butyl, sec-butyl, tertbutyl or isobutyl, most preferably methyl. These radicals may be substituted by hydroxy, $C_1$–$C_4$alkoxy; halogen or sulfo.

$R_5$ and $R_6$ in formula (1) defined as $C_1$–$C_8$alkoxy are preferably $C_1$–$C_4$alkoxy, typically methoxy, ethoxy, propoxy, sopropoxy, butoxy or isobutoxy, most preferably methoxy.

Halogen substituents $R_5$, $R_6$, $Y_1$ and $Y_2$ in formula (1) and $Y_3$ in formula (2) are e.g. fluoro or chloro, preferably chloro.

$Y_1$ and $Y_2$ in formula (1) and $Y_3$ in formula (2) defined as N-mono- or N,N-di-$C_1$–$C_4$alkylamino may be unsubstituted radicals as well as radicals which are substituted in the alkyl moiety or moieties by e.g. hydroxy. Typical examples are N-$\beta$-hydroxyethylamino and N,N-di-$\beta$-hydroxethylamino.

Preferred dyes of formula (1) are those wherein $A_1$ and $A_2$ are phenyl or phenyl which is substituted by $C_1$–$C_4$alkyl, $C_1$–$C_4$alkoxy, halogen, hydroxy, carboxy or sulfo, preferably unsubstituted or $C_1$–$C_4$alkoxy- or sulfo-substituted phenyl; preferably $A_1$ and $A_2$ are unsubstituted phenyl;

$R_1$, $R_2$, $R_3$ and $R_4$ are hydrogen or $C_1$–$C_4$alkyl, preferably hydrogen;

$R_5$ and $R_6$ are hydrogen, $C_1$–$C_4$alkyl, $C_1$–$C_4$alkoxy or halogen, preferably hydrogen;

$Y_1$ and $Y_2$ are morpholino;

m and n are each 2.

Particularly preferred dyes of formula (1) are the dyes of formula

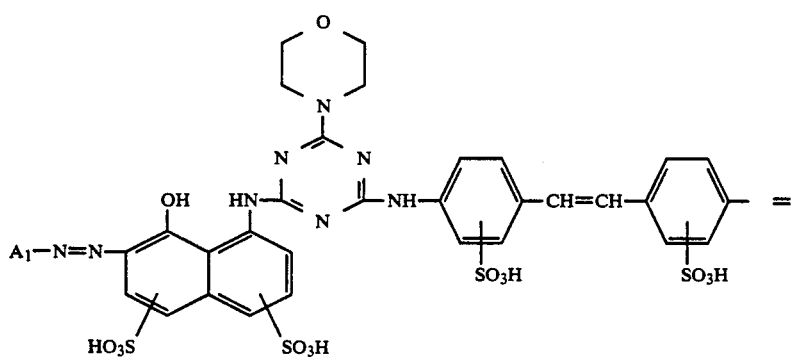

(3)

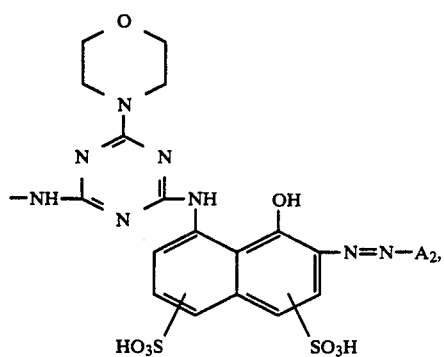

wherein $A_1$ and $A_2$ have the aforementioned meanings and preferred meanings.

A very particularly preferred dye of formula (1) is the dye of formula carboxy or sulfo, preferably unsubstituted or $C_1$-$C_4$alkoxy- or sulfo-substituted phenyl;

$R_7$ and $R_8$ are hydrogen or $C_1$-$C_4$alkyl, preferably hydrogen;

$Y_3$ is morpholino;

p and q are 1.

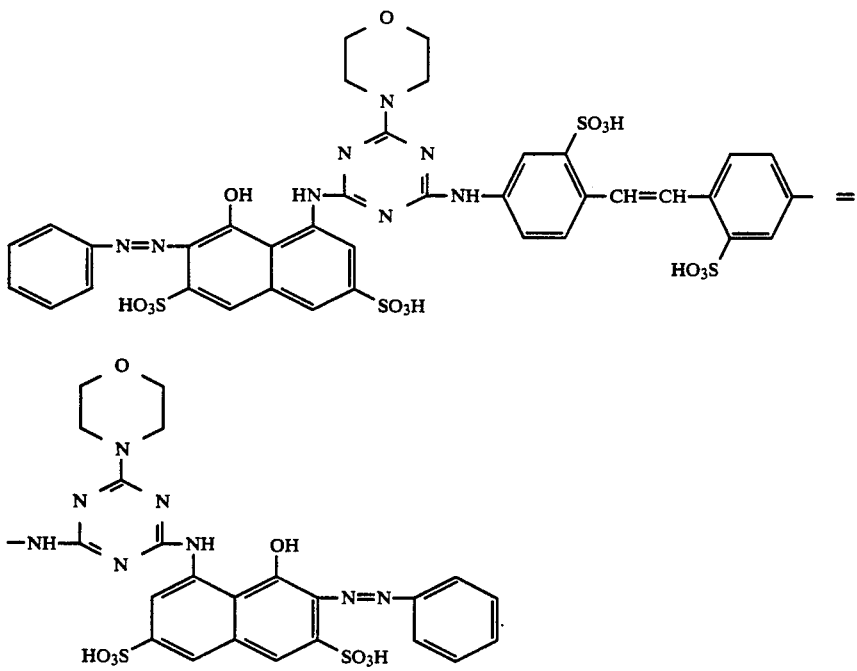

(4)

Preferred dyes of formula (2) are those wherein $B_1$ and $B_2$ are phenyl or phenyl which is substituted by $C_1$-$C_4$alkyl, $C_1$-$C_4$alkoxy, halogen, hydroxy, Particularly preferred dyes of formula (2) are the dyes of formula

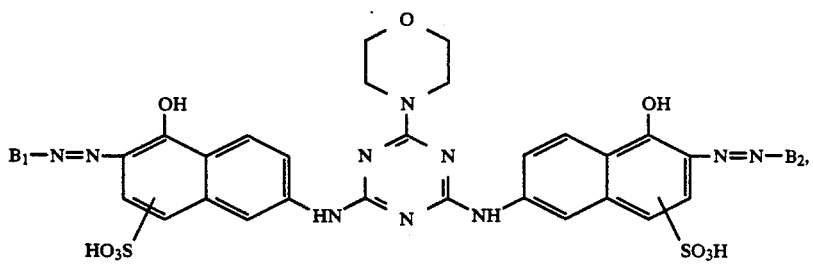

(5)

wherein $B_1$ and $B_2$ have the aforementioned meanings and preferred meanings.

A very particularly preferred dye of formula (2) is the dye of formula

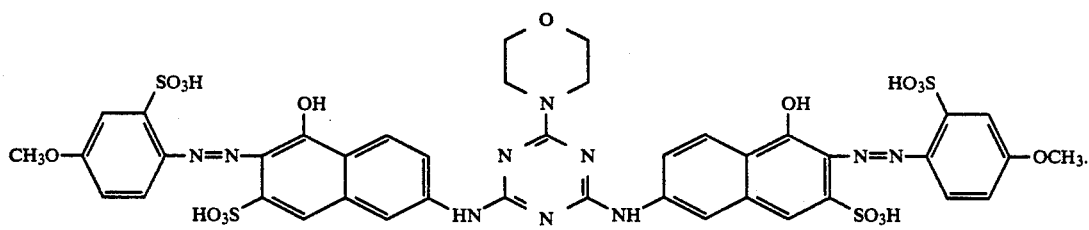

(6)

Particularly preferred dye mixtures are those wherein $A_1$ and $A_2$ in the dye of formula (1) and $B_1$ and $B_2$ in the dye of formula (2) are phenyl or phenyl which is substituted by $C_1$-$C_4$alkyl, $C_1$-$C_4$alkoxy, halogen, hydroxy, carboxy or sulfo, preferably unsubstituted or $C_1$-$C_4$alkoxy- or sulfo-substituted phenyl.

Particularly preferred dye mixtures are also those wherein $R_1$, $R_2$, $R_3$ and $R_4$ in the dye of formula (1) and $R_7$ and $R_8$ in the dye of formula (2) are hydrogen or $C_1$-$C_4$alkyl, preferably hydrogen.

Further particularly preferred dye mixtures are those wherein $Y_1$ and $Y_2$ in the dye of formula (1) and $Y_3$ in the dye of formula (2) are morpholino.

Very particularly preferred dye mixtures are those comprising a dye of formula (1) and a dye of formula (2), wherein $A_1$, $A_2$, $B_1$ and $B_2$ are phenyl or phenyl which is substituted by $C_1$-$C_4$alkyl, $C_1$-$C_4$alkoxy, halogen, hydroxy, carboxy or sulfo, $R_1$, $R_2$, $R_3$, $R_4$, $R_5$, $R_6$, $R_7$ and $R_8$ are hydrogen, $Y_1$, $Y_2$ and $Y_3$ are morpholino, m and n are each 2 and p and q are each 1.

Dye mixtures meriting particular importance are the mixtures of dyes of formulae (3) and (5), wherein $A_1$, $A_2$, $B_1$ and $B_2$ are as defined for formulae (3) and (5).

Very important dye mixtures are those which contain a dye of formula (4) as dye of formula (1) and a dye of formula (6) as dye of formula (2).

Dye mixtures wherein the ratio of the dye of formula (1) to the dye of formula (2) is from 95:5 to 5:95, more particularly from 80:20 to 20:80, most preferably from 60:40 to 40:60, are especially preferred.

The dyes of formulae (1) and (2) of the novel dye mixtures are either in the form of their free sulfonic acid or, preferably, of the salts thereof.

Suitable salts are typically the alkali metal salts, alkaline earth metal salts or the salts of an organic amine. Typical examples are the sodium, lithium, potassium or ammonium salts or the salt of mono- di- or triethanolamine.

The novel dye mixtures can be prepared by mixing the individual dyes. Mixing is typically carried out in suitable mills such as ball and pin mills as well as in kneaders or mixers.

The dye mixtures can also be prepared by spray drying the aqueous dye mixtures.

The dyes of formulae (1) and (2) are known or can be obtained by processes analogous to known ones.

With respect to their tinctorial properties, the novel dye mixtures may be termed mixtures of direct dyes (C.I. Direct Dyes).

It is a further object of this invention to provide a process for dyeing or printing nitrogen-containing or hydroxyl group containing fibre materials, typically cellulosic fibre materials, which comprises the use of the novel dye mixtures.

The novel dye mixtures are also suitable for dyeing and printing nitrogen-containing or, preferably, cellulosic fibre materials, preferably textile fabrics made from silk, wool or synthetic polyamides, as well as preferably from cellulosic fibres such as rayon, cotton or hemp.

It is also possible to dye textile fabrics made from fibre blends, typically from wool/cotton, polyamide/cotton, acrylic/cotton or, preferably, polyester/cotton blends by one bath processes and in the presence of dyes suitable for dyeing the other fibre components.

Thus blends of synthetic fibres and cellulosic fabrics, especially polyester/cotton blends, can be dyed in the presence of a disperse dye for the polyester fibres under the dyeing conditions for polyester fibres.

The textile fabrics can be in any form of presentation, typically as filaments, yarn, woven or knitted fabrics. In addition to the textile substrates, it is also possible to dye leather and paper with the dye mixtures of this invention.

Level dyeings in red shades of brilliant hue with good allround fastness properties, especially good fastness to rubbing, wet treatments, wet rubbing, perspiration and light, as well as good resistance to hard water, are obtained. Where necessary, the wetfastness properties, especially the washfastness, of the direct dyeings and prints can be further enhanced by an aftertreatment with fixing agents.

The novel dye mixtures have good compatibility with other dyes, especially with disperse dyes. They have a sufficient high-temperature stability and can therefore be used for dyeing under the dyeing conditions for polyester fibres, i.e. in the temperature range from 100° to 150° C., preferably from 120° to 130° C., from an aqueous liquor and in the pH range from 4 to 7.5, preferably from 5 to 7.

It is therefore possible to use conventional disperse dyes together with the novel dye mixtures in a single step, one bath process for dyeing polyester/cotton blends in which both fibre components are dyed in level, fast shades by the respective dye. By using a disperse dye of the same shade as the novel dye mixture it is also possible to obtain solid shade dyeings.

The use of the novel dye mixtures makes it possible to simplify greatly the dyeing of textile fibre blends, typically blends of polyester and cellulose fibres. The conventional practice of dyeing each component of a fibre blend in a separate procedure under different dyeing conditions is therefore no longer necessary.

The novel dye mixtures are also suitable for the preparation of aqueous inks for ink-jet printing.

The invention is illustrated by the following Examples in which parts and percentages are by weight. The relationship between parts by weight and parts by volume is the same as that between the kilogram and the liter.

EXAMPLE 1

12.5 parts of non-mercerised unbleached cotton fabric are wetted with one part of a non-ionic wetting agent at 80° C. The cotton fabric is pinched off and put into a warm dye solution of 50° C. which contains 1.9% of a mixture of the following dyes of formulae (4) and (6) in the ratio of 1:1.3

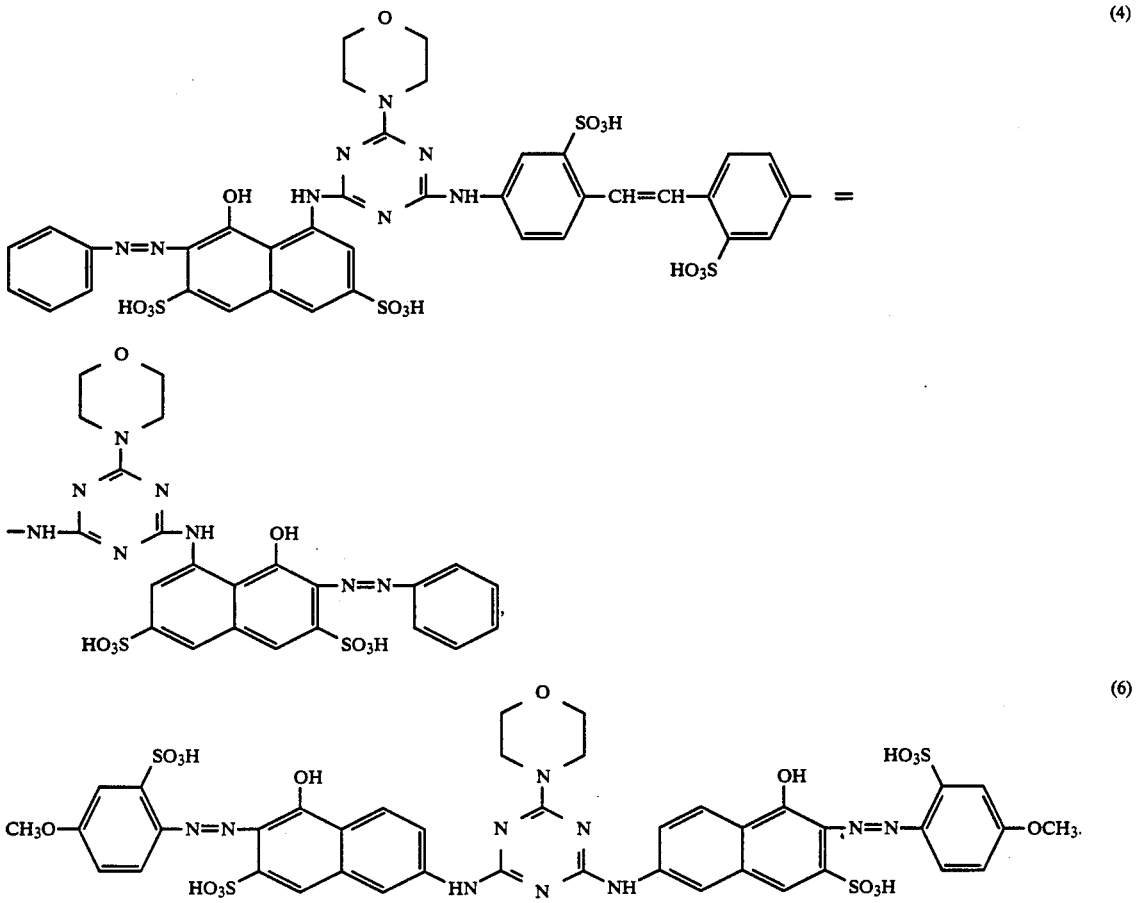

The liquor ratio is 1:20. The dyebath is heated over 30 minutes to boiling temperature, then 20 g/l of sodium sulfate are added in three portions, and the dyebath is kept for 45 minutes at boiling temperature. Afterwards the dyed cotton fabric is removed from the bath, washed with cold water and dried. The cotton fabric is dyed in a red shade of good allround fastness properties.

EXAMPLE 2

250.8 parts of thoroughly wetted polyester/cotton knitgoods containing, per 100 parts, 30 parts of polyester and 70 parts of cotton, are put at 60° C. into a high-temperature jet-dyeing machine. The liquor ratio is 1:7. Afterwards the following auxiliaries are added to the dyebath:

0.75 g/l of a commercial lubricant (oxyalkylene-polyester condensate type),
0.3 g/l of a maleate-based silicone-free penetration accelerator,
1 g/l of a levelling assistant (ammonium salt of an acid-modified polyhydroxyalkylene glycol ether),
2 g/l of a monosodium dihydrogen phosphate buffer,
2 g/l of sodium m-nitrobenzenesulfonate, and
10 g/l of sodium sulfate.

The pH is adjusted to 5 with acetic acid. The dye liquor is kept for 5 minutes at 60° C. and then a mixture comprising 0.9 part of a mixture of the dyes of formulae (4) and (6) in the ratio of 1:1.3 and 0.3 part of the disperse dye of formula

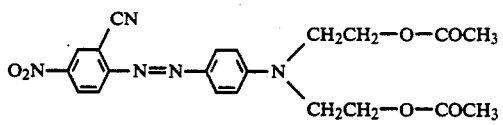

is added to the dyebath. The dyebath is then heated at a heating up rate of 2° C./minute to a temperature of 130° C., kept at this temperature for 30 minutes, and thereafter cooled at a cooling rate of 1.5° C./minute to 80° C. The dyebath is kept for 15 minutes at this temperature. The dyebath is then drawn off and the dyed material is washed twice for 5 minutes with warm water of 30° C. The dyeing is finished in conventional manner by drying. The dried material is dyed in a red shade.

What is claimed is:

1. A dye mixture comprising at least one dye of formula

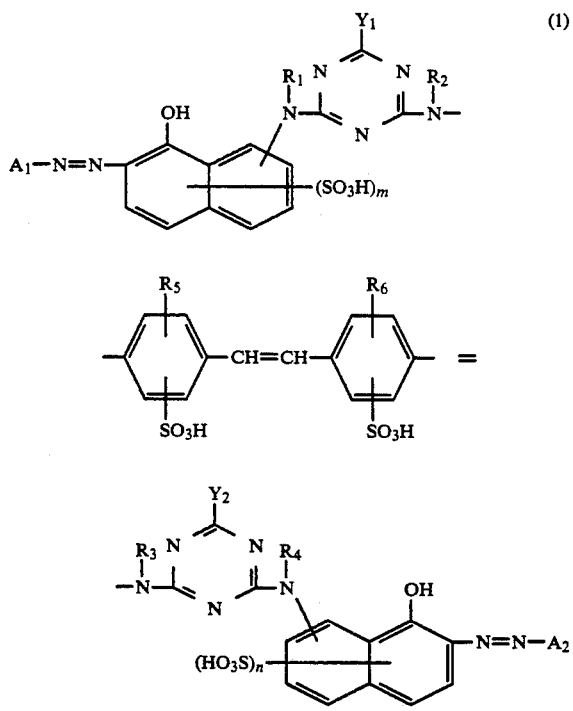

and at least one dye of formula

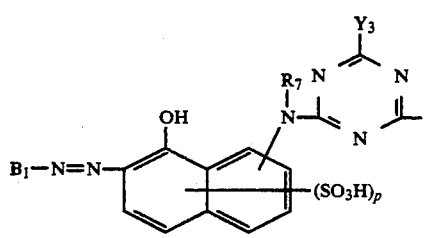

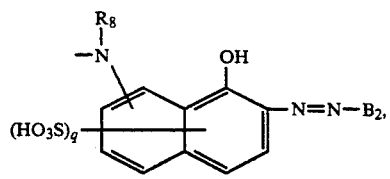

wherein $A_1$, $A_2$, $B_1$ and $B_2$ are each independently of one another unsubstituted phenyl or naphthyl or phenyl or naphthyl which is substituted by $C_1$-$C_4$alkyl, $C_1$-$C_4$alkoxy, halogen, hydroxy, carboxy or sulfo, $R_1$, $R_2$, $R_3$, $R_4$, $R_7$ and $R_8$ are each independently of one another hydrogen or unsubstituted or substituted $C_1$-$C_8$alkyl, $R_5$ and $R_6$ are each independently of the other hydrogen, unsubstituted or substituted $C_1$-$C_8$alkyl, or are $C_1$-$C_8$alkoxy, halogen, hydroxy, carboxy or sulfo, $Y_1$, $Y_2$ and $Y_3$ are each independently of one another halogen, amino, N-mono- or N,N-di-$C_1$-$C_4$alkylamino which are unsubstituted or substituted in the alkyl moiety or moieties, or are morpholino, and m, n, p and q are each independently of one another 1 or 2 and wherein the ratio of dye of formula (1) to dye of formula (2) is from 95:5 to 5:95.

2. A dye mixture according to claim 1, wherein $A_1$ and $A_2$ in the dye of formula (1) and $B_1$ and $B_2$ in the dye of formula (2) are phenyl or phenyl which is substituted by $C_1$-$C_4$alkyl, $C_1$-$C_4$alkoxy, halogen, hydroxy, carboxy or sulfo.

3. A dye mixture according to claim 1, wherein $R_1$, $R_2$, $R_3$ and $R_4$ in the dye of formula (1) and $R_7$ and $R_8$ in the dye of formula (2) are hydrogen or $C_1$-$C_4$alkyl.

4. A dye mixture according to claim 1, wherein $Y_1$ and $Y_2$ in the dye of formula (1) are morpholino.

5. A dye mixture according to claim 1, wherein $Y_3$ in the dye of formula (2) is morpholino.

6. A dye mixture according to claim 1, wherein $R_5$ and $R_6$ in the dye of formula (1) are hydrogen.

7. A dye mixture according to claim 1, wherein m and n in the dye of formula (1) are each 2.

8. A dye mixture according to claim 1, wherein p and q in the dye of formula (2) are each 1.

9. A dye mixture according to claim 1, which contains a dye of formula (1) and a dye of formula (2), wherein $A_1$, $A_2$, $B_1$ and $B_2$ are phenyl or phenyl which is substituted by $C_1$-$C_4$alkyl, $C_1$-$C_4$alkoxy, halogen, hydroxy, carboxy or sulfo, $R_1$, $R_2$, $R_3$, $R_4$, $R_5$, $R_6$, $R_7$ and $R_8$ are hydrogen, $Y_1$, $Y_2$ and $Y_3$ are morpholino, m and n are each 2 and p and q are each 1.

10. A dye mixture according to claim 9, which contains a dye of formula

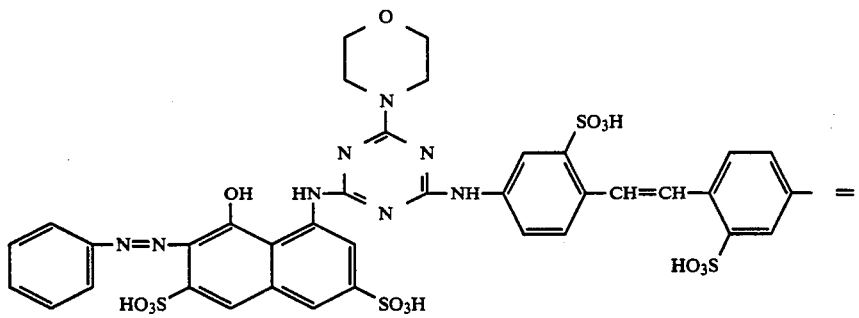

as dye of formula (1), and a dye of formula

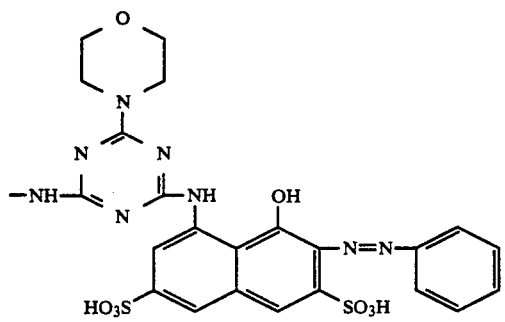

as dye of formula (2).

11. A dye mixture according to claim 1, wherein the ratio of dye of formula (1) to dye of formula (2) is from 80:20 to 20:80.

12. A dye mixture according to claim 2 wherein $A_1$ and $A_2$ in the dye of formula (1) and $B_1$ and $B_2$ in the dye of formula (2) are selected from the group consisting of unsubstituted phenyl, $C_1$-$C_4$alkoxy-substituted phenyl or sulfo-substituted phenyl.

13. A dye mixture according to claim 3 wherein $R_1$, $R_2$, $R_3$ and $R_4$ in the dye of formula (1) and $R_7$ and $R_8$ in the dye of formula (2) are hydrogen.

14. A dye mixture according to claim 1 wherein the ratio is from 60:40 to 40:60.

15. A dye mixture according to claim 10 wherein the

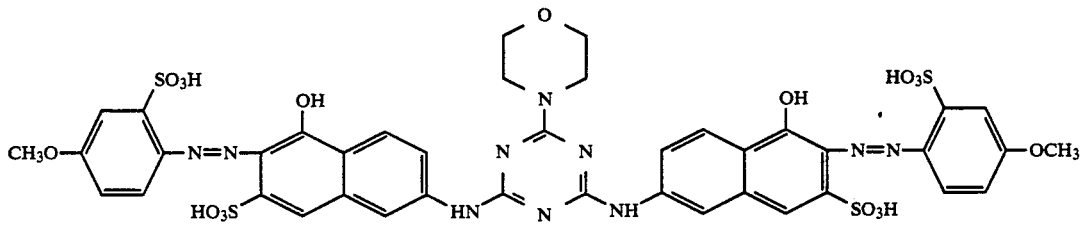

ratio is from 60:40 to 40:60.

16. A process for dyeing or printing a nitrogen or hydroxyl containing fiber material, which comprises applying a dye mixture of claim 1 to the material.

17. A process of claim 16 wherein the material is a polyester/cotton blend and the dye mixture and at least one disperse dye are applied to the material from an aqueous liquor, at a temperature of from 100° to 150° C., and a pH of from 4 to 7.5, by means of a single step, one bath process.

18. A process of claim 17 wherein the temperature is from 120° to 130° C.

19. A process of claim 17 wherein the dye mixture comprises a dye of formula

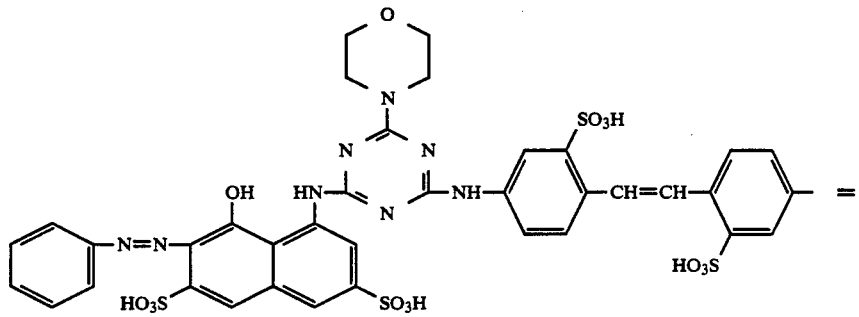

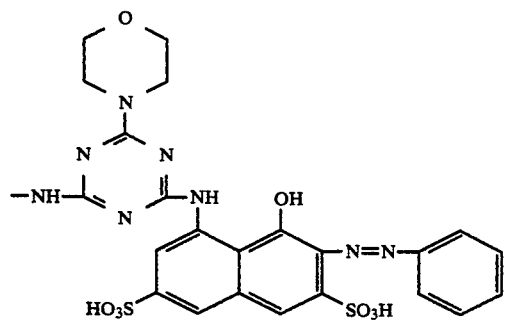
as dye of formula (1), and a dye of formula
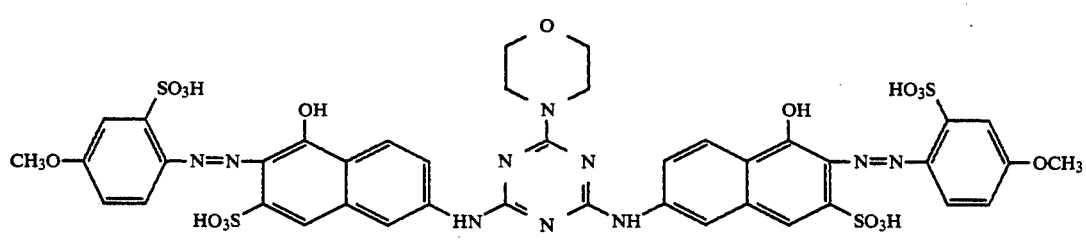
as dye of formula (2), wherein the ratio of the dye of formula (4) to the dye of formula (6) is from 60:40 to 40:60.
* * * * *